United States Patent
Häußermann et al.

(10) Patent No.: US 9,470,780 B2
(45) Date of Patent: Oct. 18, 2016

(54) SENSOR DEVICE FOR A COMPUTER SYSTEM, COMPUTER SYSTEM WITH A SENSOR DEVICE AND OPERATING METHOD FOR A SENSOR DEVICE

(71) Applicant: Fujitsu Technology Solutions Intellectual Property GmbH, München (DE)

(72) Inventors: Rudolf Häußermann, Augsburg (DE); Timo Bruderek, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/443,671

(22) PCT Filed: Dec. 10, 2012

(86) PCT No.: PCT/EP2012/074968
§ 371 (c)(1),
(2) Date: May 19, 2015

(87) PCT Pub. No.: WO2014/090279
PCT Pub. Date: Jun. 19, 2014

(65) Prior Publication Data
US 2015/0301166 A1    Oct. 22, 2015

(51) Int. Cl.
*G01S 7/539*    (2006.01)
*G01S 15/08*    (2006.01)
*G01S 15/52*    (2006.01)
*G06F 3/038*    (2013.01)

(52) U.S. Cl.
CPC .............. *G01S 7/539* (2013.01); *G01S 15/08* (2013.01); *G01S 15/523* (2013.01); *G06F 3/038* (2013.01)

(58) Field of Classification Search
CPC ...... G06F 3/038; G01S 15/08; G01S 15/523; G01S 7/539
See application file for complete search history.

(56) References Cited

U.S. PATENT DOCUMENTS 5,689,250 A    11/1997    Kremser
7,724,355 B1    5/2010    McIntosh et al.
(Continued)

FOREIGN PATENT DOCUMENTS

| DE | WO 2014090279 A1 | * | 6/2014 | .............. G06F 3/038 |
| DE | EP 2929367 A1 | * | 10/2015 | .............. G06F 3/038 |
| JP | 9-505895 | | 6/1997 | |

(Continued)

OTHER PUBLICATIONS

Japanese Office Action dated Jun. 7, 2016, of corresponding Japanese Application No. 2015-545680, along with an English translation.

*Primary Examiner* — Daniel Pihulic
(74) *Attorney, Agent, or Firm* — DLA Piper LLP (US)

(57) ABSTRACT

A sensor device for a computer system has a transceiver unit and a data processing device connected to the transceiver unit, wherein the data processing device is configured to predefine emission of signals at measuring intervals for the transceiver unit; detect, on the basis of received, reflected signals, signal ranges assignable to objects; define a deviation in intensities of the received signal ranges over a plurality of measuring intervals for associated, detected signal ranges; and decide, on the basis of the defined deviation, whether a change has taken place in the object assigned to the respectively detected signal range.

16 Claims, 6 Drawing Sheets

(56) References Cited

U.S. PATENT DOCUMENTS

2009/0213694 A1   8/2009   Zott et al.
2015/0301166 A1*  10/2015  Hau ermann ........... G06F 3/038
                                                        367/99

FOREIGN PATENT DOCUMENTS

| JP | 2002-233527 | 8/2002 |
| JP | 2006-003159 | 1/2006 |
| WO | 2010/003210 | 1/2010 |

* cited by examiner

SENSOR DEVICE FOR A COMPUTER SYSTEM, COMPUTER SYSTEM WITH A SENSOR DEVICE AND OPERATING METHOD FOR A SENSOR DEVICE

TECHNICAL FIELD

This disclosure relates to a sensor device for a computer system which has a transceiver unit and a data processing device connected to the transceiver unit. The disclosure furthermore relates to a computer system comprising a sensor device and an operating method for a sensor device.

BACKGROUND

Sensor devices that detect objects or persons are known. Sensor devices of this type are used in various technical sectors. Ultrasound sensors are frequently used for this purpose. In the automotive sector, ultrasound sensors are used, for example, to assist the vehicle owner with parking. During reversing, for example, the sensors detect obstacles in the vicinity of the vehicle and thus prevent a collision with that vehicle. In medicine, devices are used by which organs or their contours in the human body can be detected.

For the detection of objects, ultrasound sensors emit ultrasound signals or waves into the environment which are reflected by objects. The reflected ultrasound signals can be received by the ultrasound sensors. The distances to the objects can finally be calculated by the signal transit delays.

There is nonetheless a need for a sensor device, a computer system and an operating method for a sensor device which enable a reliable and accurate distinction between changed and unchanged objects.

SUMMARY

We provide a sensor device for a computer system, having a transceiver unit and a data processing device connected to the transceiver unit, wherein the data processing device is configured to predefine emission of signals at measuring intervals for the transceiver unit; detect, on the basis of received, reflected signals, signal ranges assignable to objects; define a deviation in intensities of the received signal ranges over a plurality of measuring intervals for associated, detected signal ranges; and decide, on the basis of the defined deviation, whether a change has taken place in the object assigned to the respectively detected signal range.

We also provide a desktop or tower computer system with the sensor device, having a display screen unit on which the sensor device is attached or into which the sensor device is integrated, wherein the computer system is configured to switch the display screen unit and/or the computer system to a predefined operating mode, on the basis of the data calculated and/or evaluated by the sensor device.

We further provide a method of operating the sensor device including emitting signals at a multiplicity of measuring intervals; receiving reflected signals within the multiplicity of measuring intervals; detecting signal ranges on the basis of the received, reflected signals assignable to objects; defining a deviation in the intensities of associated signal ranges over the multiplicity of measuring intervals; and deciding, on the basis of the defined deviation, whether a change has taken place in the object assigned to the respectively detected signal range.

REFERENCE NUMBER LIST

BE Display screen unit
BV Operating method
CS Computer system
D1, D2 Distance
DIST Distance
DV Data processing device
F1, F2 Area
INT Intensity
M1, M2, M3 Measurement
MI Measuring interval
O1, O2 Object
PRE Presence
S1, S2 Signal range
SC1 to SC5 Steps
SE Sensor device
SUE Transceiver unit
SW1, SW2 Threshold value
T Time
US Ultrasound signal
VAR Variance

DETAILED DESCRIPTION

Our sensor device for a computer system may have a transceiver unit and a data processing device connected to the transceiver unit. The data processing device may be configured to predefine emission of signals at measuring intervals for the transceiver unit. Furthermore, the data processing device may be configured to detect, on the basis of received, reflected signals, signal ranges assignable to objects. Furthermore, the data processing device may be configured to define a deviation, in particular a variance, in the intensities of the detected signal ranges over a plurality of measuring intervals for associated, detected signal ranges. Furthermore, the data processing device may be configured to decide, on the basis of the defined deviation, whether a change has taken place in the object assigned to the respectively detected signal range.

The sensor device emits signals, for example, ultrasound signals by the transceiver unit. A signal emitted during a measuring interval can be reflected on different objects located in the vicinity. The reflected signals can again be received by the transceiver unit. The data processing device then detects signal ranges assignable to objects. The data processing device then defines, for associated detected signal ranges, a deviation, for example, a variance in the intensities of the detected signal ranges over a plurality of measuring intervals. On the basis of the defined deviation, for example, by a limit value or threshold value, the data processing device then decides whether the object assigned to the respectively detected signal range has changed. A change may, for example, be a movement of the object. A low deviation indicates an unchanged or static object, a high deviation indicates a changed, for example, moving object. It is thus possible in a simple manner to be able to distinguish accurately between a changed and an unchanged object.

The data processing device may furthermore be configured to evaluate the defined deviation by an integration method so that a size or reflection area of an object can be determined. By determining the size or reflection area of an object, it is possible to ascertain, for example, whether the detected object is, for example, an object to be monitored such as, for example, a person or an interfering object such as, for example, a fly.

The data processing device may furthermore be configured to determine a direction of movement of a moving object, wherein distance changes of the object are calculated on the basis of the detected signal ranges over a plurality of measuring intervals. As a result, it is possible, for example, to detect whether an object is moving toward the sensor, is moving away from the sensor or is passing by the sensor.

The data processing device may have a microcontroller. Compared to discrete circuits or powerful microprocessors, microcontrollers are characterized by lower costs and a very low power consumption.

We also provide a computer system, in particular a desktop or tower system, which has a sensor device. The computer system may furthermore have a display screen unit on which the sensor device is attached or into which the sensor device is integrated. The computer system may be configured to switch the display screen unit and/or the computer system to a predefined operating mode, in particular an energy-saving mode, on the basis of the data calculated and/or evaluated by the sensor device.

The computer system may essentially have the aforementioned advantages. A computer system of this type is, for example, able to detect whether a user is moving toward a computer or away from it. On the basis of this information, it can switch itself or the display screen unit, for example, to an energy-saving mode in the absence of a user or, in the presence of the user, from an energy-saving mode to a normal operating mode. The energy consumption and/or energy costs of the computer system can thus be reduced. It is also possible, for example, that the computer system activates an access lock and/or one or more further operating modes in the absence of a user.

We further provide an operating method for a sensor device, in particular for a sensor device, which comprises the following steps:
  emitting signals at a multiplicity of measuring intervals,
  receiving reflected signals within the multiplicity of measuring intervals,
  detecting signal ranges on the basis of the received, reflected signals which are assignable to objects,
  defining a deviation, in particular a variance, in the intensities of associated signal ranges over the multiplicity of measuring intervals, and
  deciding, on the basis of the defined deviation, whether a change has taken place in the object assigned to the respectively detected signal range.

Advantageously, the operating method may have the following further step:
  determining the size or reflection area of an object assigned to a detected signal range, wherein the defined deviation is evaluated by an integration method.

Further advantageously, the operating method may have the following further step:
  determining directions of movement of moving objects, wherein distance changes in the objects are calculated on the basis of the detected signal ranges over the plurality of measuring intervals.

The operating method essentially has the aforementioned advantages.

Further advantageous designs are disclosed in the following detailed description of examples.

Examples are described below with reference to the attached figures. In the figures, similar components of different examples are denoted with the same reference numbers.

Figure 1:
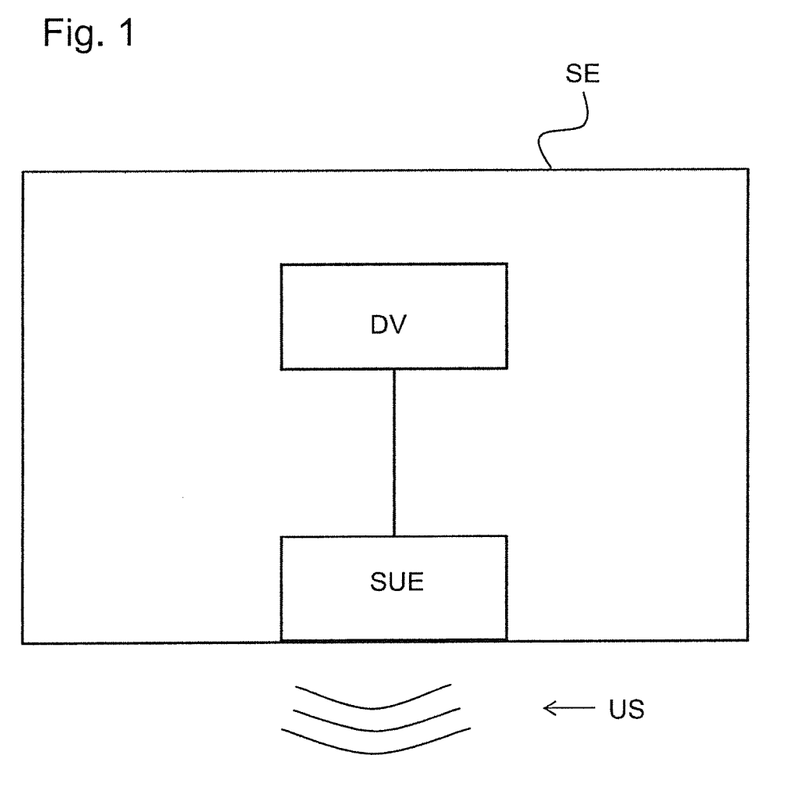
FIG. 1 shows a schematic representation of a sensor device.

FIG. 1 shows a schematic representation of a sensor device SE. The sensor device SE which comprises, for example, an ultrasound sensor has a transceiver unit SUE and a data processing device DV. The data processing device DV may, for example, be designed as a microcontroller. The transceiver unit SUE may, for example, be designed as a piezo converter that generates and receives ultrasound signals and connects to the data processing device DV. The transceiver unit SUE, designed as a unit in FIG. 1, may alternatively also consist of physically separated units that receive or transmit signals, and may form a logical unit. The data processing device DV instructs the transceiver unit SUE cyclically, i.e., for recurring measuring intervals, to emit an ultrasound signal. Signals may be emitted, for example, by a pulse, for example, a Dirac pulse. In addition, the sensor device SE may have a memory (not shown) configured to store and manage received signals or processed data of the data processing device DV.

The transceiver unit SUE transmits the ultrasound signal US at the beginning of a measuring interval, the signal propagating in the form of ultrasound waves in the spatial environment of the sensor device SE. A measuring interval of the sensor device SE is, for example, 200 ms long. The ultrasound signal US can be reflected at least partially on different objects located in the space and can return as an echo or reflected signal to the transceiver unit SUE. The reflected signals are received and converted by the transceiver unit SUE, and are forwarded as electrical signals to the data processing device DV for processing of the signal data.

The received signals return to the transceiver unit SUE at different times after emission of the ultrasound signal US within the measuring interval and have different signal intensities. The signal intensities vary according to the distance at which the object is located and/or how, for example, at what angle the signal has been reflected by this object. Distances to the objects in the vicinity can thus be calculated for a measuring interval by, for example, the known speed of sound in air and the respective time intervals elapsed between the emission of the ultrasound signal US and reception of the reflected signals by the transceiver unit SUE. A plurality of temporally staggered received signals and their intensities can thus be assigned to differently distant objects and can be recorded for each measuring interval.

Figure 2:
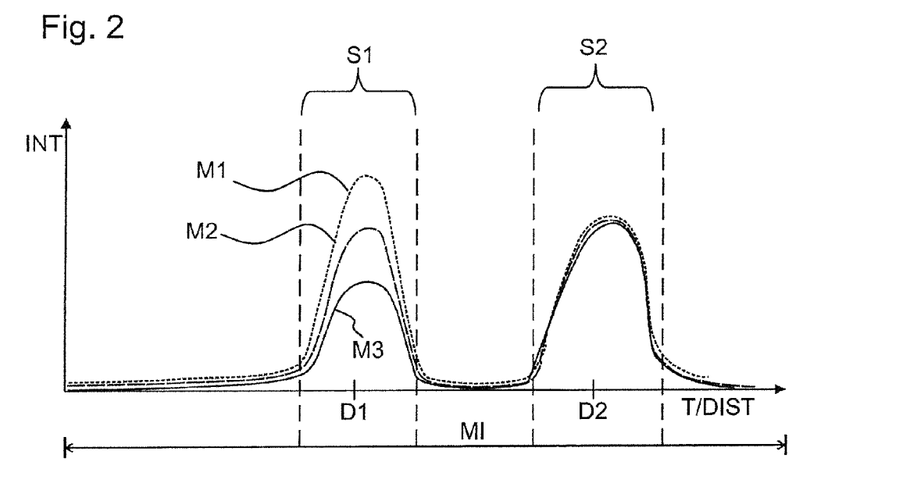
FIG. 2 shows a schematic representation of signals in a diagram.

In FIGS. 2 to 6 described below, measurements and their evaluations or calculations of the sensor device SE according to the design of FIG. 1 are explained schematically with reference to diagrams FIG. 2 schematically shows a diagram representing the variation with time of a measuring interval MI. Three measurements M1, M2 and M3 of three consecutive measuring intervals MI are shown in this diagram. The x-axis of the diagram describes the time T and the y-axis the intensities INT of received signals reflected by objects. The measured times T are proportional to distances of the objects so that a corresponding distance DIST or distance to an object can be assigned to each time T of a reflected signal. Each measurement M1 to M3 or each measuring interval MI is preceded by an emitted signal, for example, an ultrasound signal US of the transceiver unit SUE, the signal having been reflected on different objects.

According to FIG. 2, the transceiver unit SUE has received signals for each measurement M1 to M3 from which two signal blocks or signal ranges S1 and S2, which can be assigned to two objects, can be detected or identified by the data processing device DV. The detection can take place, for example, by a comparison with a limit value. The limit value may be an intensity INT or a rise in the signal characteristic, for example, a derivation. If the received signals therefore have a range of associated signals with intensities INT above this limit value over the time T, an object can be assigned to this signal range. It can be inferred from this that objects or obstacles that have been detected by the sensor device SE are located approximately at a distance D1 or D2. The distances D1 and D2 are essentially determined according to the highest intensity INT of the respective signal range S1 and S2. The distances D1 and D2 may in each case also correspond to a distance range. Over the three measurements M1 to M3, it is evident that the signal range S2 in each case has essentially similar intensities INT or intensity characteristics. In contrast to this, the signal range S1 has significantly different intensities INT for each measurement M1 to M3.

The intensities INT of the detected signal ranges S1 and S2 are processed by the data processing device DV. The data processing device DV in each case calculates a deviation for each signal range S1 and S2 from the intensities INT of the measurements M1 to M3. A variance VAR is calculated in the examples. The variance VAR, which describes the average squared deviation from a mean value is plotted in the diagram in FIG. 3 over the distance DIST or the time T. It is evident in the diagram shown that the signal range S1, compared to the signal range S2, has a significantly higher variance VAR. From this difference, it can be ascertained whether a changed, for example, moving object or an unchanged, for example, static or motionless object can be assigned to the signal ranges S1 and S2. A high variance VAR indicates a moving object since the emitted ultrasound signal US is reflected, for example, differently by this object with each measurement M1 to M3. As a result, the transceiver unit SUE receives different intensities INT of the received signals. For example, the slightest movements such as the breathing of a person, already significantly change the intensities INT of received signals or signal ranges. Conversely, in a static or motionless object, signals are reflected in an essentially similar manner for each measuring interval MI, resulting in a low variance for this object. The reason for this is that the emitted ultrasound signals US are essentially always reflected in the same way, for example, at the same angle.

Figure 3:
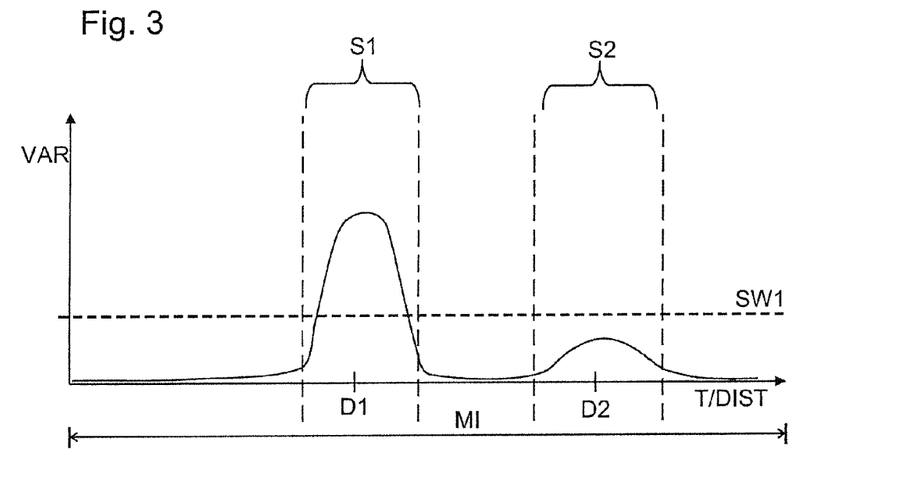
FIG. 3 shows a schematic representation of variances in a diagram.

Instead of the variance VAR, a standard deviation, for example, could also be calculated or differences of the deviations from a mean value could be summed. The more substantial computing overhead compared to the variance VAR is disadvantageous if a standard deviation is used, in particular due to root operations. The disadvantage in the summation of the differences is that signs are taken into account and positive and negative deviations may cancel each other out. If the variance VAR is used, signs are advantageously not taken into account by squaring the deviations. In addition, a heavy weighting is allocated even to small deviations due to the squaring.

The data processing device DV can then decide or evaluate, for example, using a threshold value SW1, whether the signal range S1 corresponds to a moving or motionless object. If a signal range essentially has a higher variance VAR than the threshold value SW1, a moving object can be assigned to this signal range. Signal ranges with a lower variance VAR than the threshold value SW1, i.e., essentially motionless objects, can thus be filtered out. Conversely, moving objects can also be filtered out if, for example, static objects are to be detected.

The sensor device SE can thus accurately define in a simple manner whether a moving or motionless object is located in the vicinity. To do this, the variance VAR of detected signal ranges is calculated over different measuring intervals MI. To do this, three measurements M1 to M3 are provided for the evaluation in the example shown. It is also possible, however, for more than three measurements to be used for the definition of the variance VAR, for example, to increase the significance of the distinction between moving and motionless objects.

Figure 4:
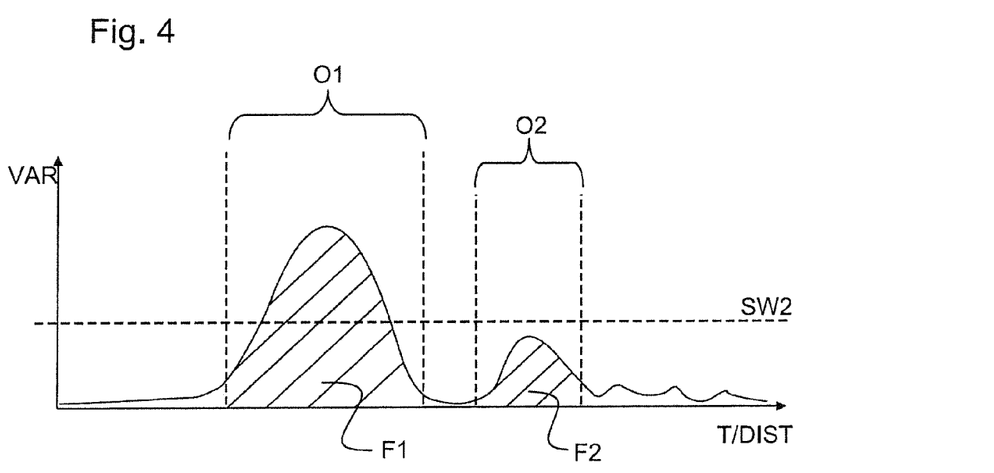
FIG. 4 shows a further schematic representation of variances in a diagram.

FIG. 4 shows a further schematic diagram representing a characteristic of variances VAR defined by the procedure shown in FIGS. 2 and 3. Two moving objects O1 and O2 can be identified on the basis of this variance characteristic, wherein their variances VAR, for example, have exceeded the threshold value SW1 described with reference to FIG. 3.

The data processing device DV of the sensor device SE is then configured to distinguish a reflection area or an object size of the two objects O1 and O2. To do this, the data processing device DV evaluates the determined variances VAR by an integration method known per se on which the respective objects O1 and O2 are based. In the example shown, integrals of the variances VAR associated with the objects O1 and O2 are thus calculated. This corresponds to areas F1 and F2 of the variance curve according to the diagram in FIG. 4. Inferences can be made regarding the reflection size of the objects O1 and O2 on the basis of these areas F1 and F2. In particular, a changing, for example, moving area of an object can be inferred. For example, when a person breathes, virtually the entire upper body moves, as a result of which a large area of the person changes. Conversely, if, for example, in a large object such as a hall clock, a hand moves, only a small area of the object changes. A distinction can thus be made between two large objects. For example, these areas F1 and F2 are in turn compared to a threshold value SW2 or limit value. In this way, sizes of the changing or moving areas of objects can be distinguished and inferences can be made regarding the size of the object. For example, persons can be distinguished from small objects such as, for example, a fly or steam produced by a kettle.

Figure 5:
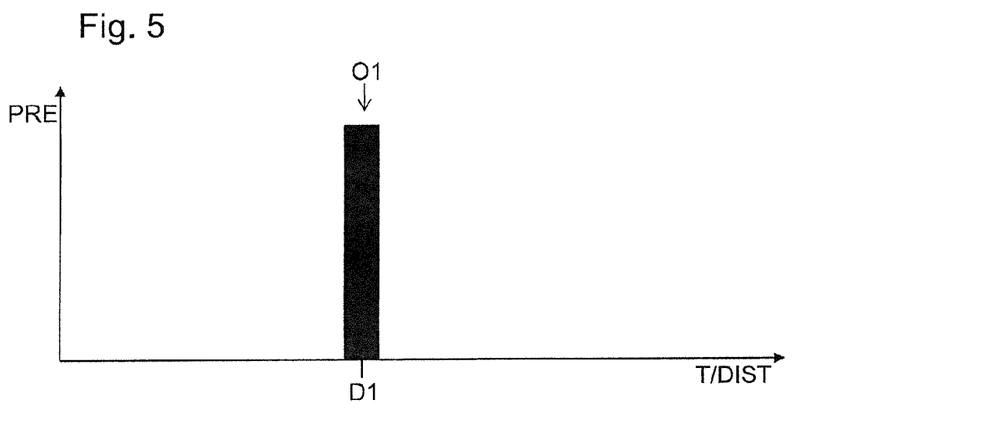
FIG. 5 shows a schematic representation of an object detection in a diagram.

If the data processing device DV has identified a large object such as, for example, a person, it indicates a distance D1 for the identified object, in the example shown the object O1, describing the distance between the sensor device SE and the object O1. Identification or detection of the object O1 may, for example, be indicated in a presence diagram, wherein the presence PRE is plotted, for example, as a logical 1 over the distance DIST. This is shown in FIG. 5. The presence of a person, for example, can thus be determined in a simple manner.

Figure 6:
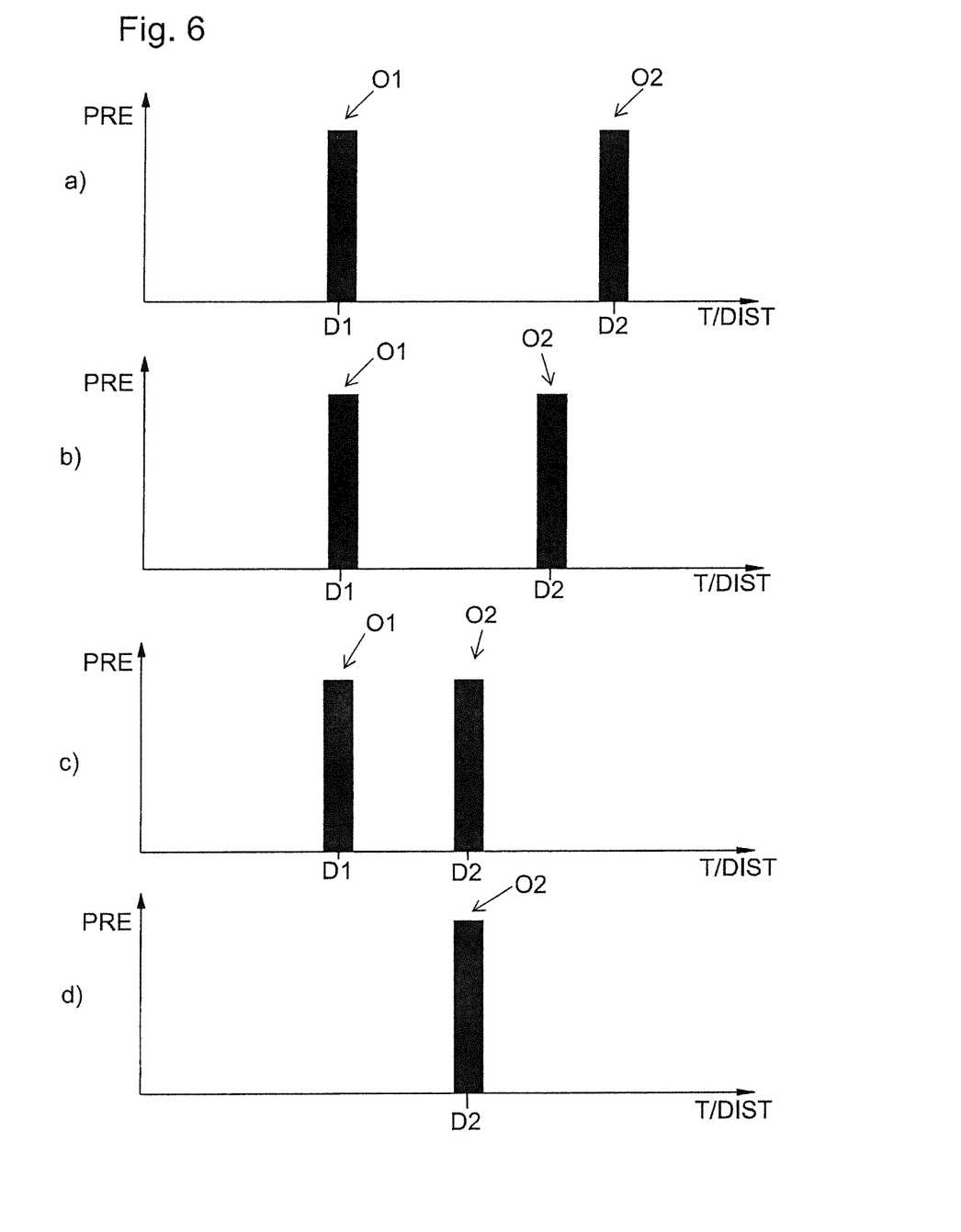
FIG. 6 shows schematic representations of object detections in diagrams.

FIG. 6 shows four presence diagrams a), b), c), and d) of the type just described. The sensor device SE or the data processing device DV has identified two objects O1 and O2 as moving and sufficiently large objects in the first diagram. To then distinguish whether an object O1 or O2 is moving toward the sensor device SE or is moving away from the letter, further measuring intervals MI are then evaluated by the data processing device DV according to the method described with reference to FIGS. 2 to 5. It is determined by the data processing device DV how the distances DIST or the distances between the objects O1 and O2 and the sensor device SE change in the course of a plurality of measuring intervals MI.

The diagrams b) and c) in FIG. 6 show that the object O1 does not essentially change its distance according to the distance range D1 from the sensor device SE. The object O1 could move accordingly, for example, past the sensor device SE at an essentially constant distance from the latter. The object O2, on the other hand, changes its distance with time and moves toward the sensor device SE. The data processing device DV is configured to determine the distance changes over time and calculate distance changes therefrom. If a distance change is greater than a predetermined threshold value, it can thus be detected, for example, whether an object is moving toward the sensor device SE.

Figure 7:
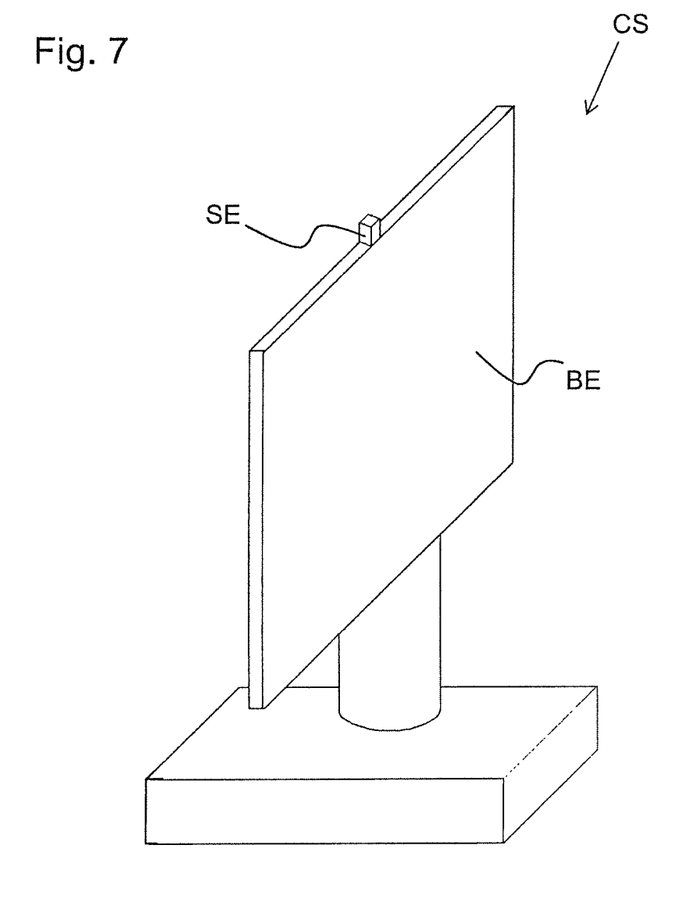
FIG. 7 shows a schematic representation of a computer system with the sensor device.

FIG. 7 shows a schematic representation of a computer system CS. The computer system CS has a display screen unit BE. A sensor device SE according to the design shown in FIG. 1 is attached, for example, screwed, glued or clamped to the display screen unit BE. The sensor device SE may, however, also be integrated into the display screen unit BE. The computer system CS is configured to switch the display screen unit BE and/or the computer system CS itself to a predefined operating mode by the data evaluated by the sensor device SE.

If the sensor device SE detects, for example, that the user of the computer system CS is moving away from the computer system CS, the computer system CS can switch the display screen unit BE or the computer system CS itself to an energy-saving mode. Conversely, it is possible, while the computer system CS or the display screen unit BE is in the energy-saving mode, for the sensor device SE to detect a user who is moving toward the computer system CS and wishes to operate the computer system CS. This is detected by the sensor device SE and the computer system CS can switch the display screen unit BE or the computer system CS itself from the energy-saving mode to an operating mode. If a user moves past the sensor, the computer system CS does not change its mode.

If a user who has moved toward the computer system CS and has been detected by the sensor device SE is located in front of the computer system CS which is in the normal operating mode, the computer system CS itself and/or the display screen unit BE is prevented from switching, for example, to an energy-saving mode. The sensor device SE detects movements, for example, breathing of the user. If the sensor device SE detected no movement of the user located in front of the display screen unit BE for several seconds, for example, 5 to 7 seconds, the computer system CS itself and/or the display screen unit BE can switch to a predefined operating mode such as, for example, an energy-saving mode.

Alternatively or additionally, the computer system can also activate a different operating mode such as, for example, an access lock if the user moves away.

Figure 8:
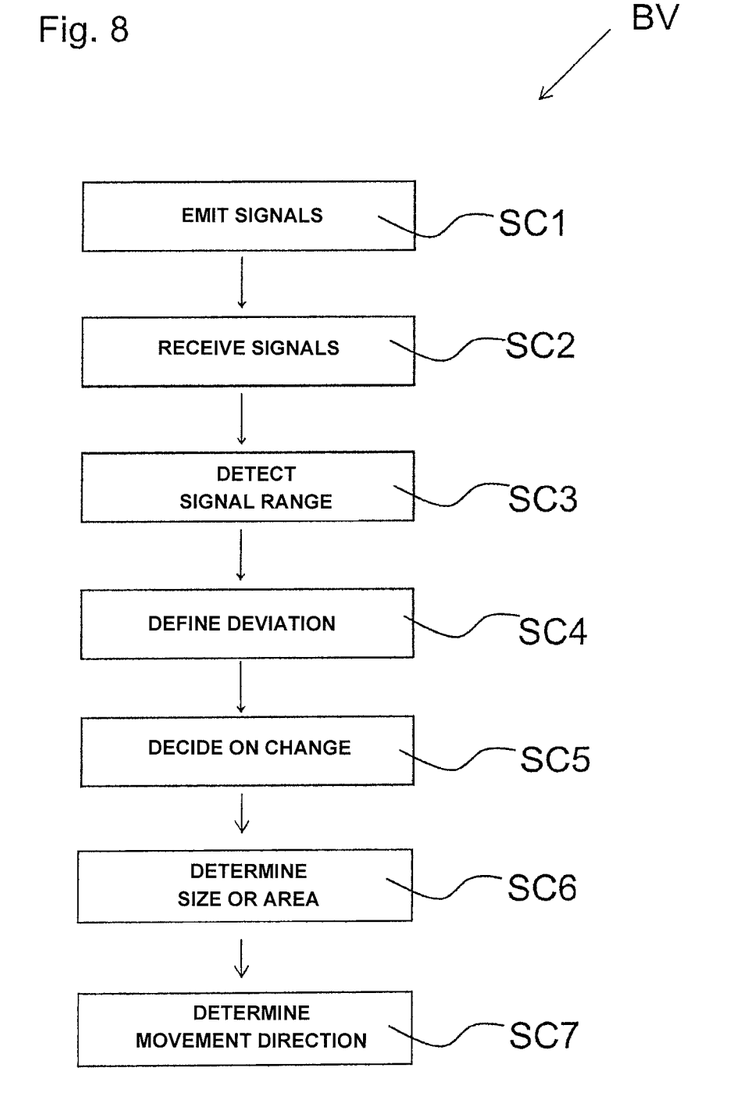
FIG. 8 shows a flow diagram of an operating method of the sensor device.

FIG. 8 shows a flow diagram for an operating method BV of the sensor device SE just described.

In a first step SC1, signals, for example, ultrasound signals US are emitted at a plurality of measuring intervals MI. Emission of the signal is, for example, predefined by the data processing device DV and occurs primarily at the beginning of each measuring interval MI.

In a step SC2, signals reflected within the plurality of measuring intervals MI are received by the transceiver unit SUE. These signals are converted and forwarded as electrical signals to the data processing device DV for the processing of the signals.

In a step SC3, signal ranges, for example, the signal ranges S1 and S2 are detected using the reflected signals received in step SC2 which are assignable to objects. This is effected by the data processing device DV, for example, using a limit value. A limit value of this type may, for example, be an intensity INT or flank rise of the signal. Temporally immediately consecutive signals of a measuring interval MI which have intensities INT above the limit value are combined to form signal ranges and are assigned to an object.

In a step SC4, the data processing device DV defines a deviation, in particular a variance VAR, of the intensities INT of associated signal ranges over the plurality of measuring intervals MI.

In a step SC5, the data processing device DV decides on the basis of the defined deviation whether a change has taken place in the object assigned to the respectively detected signal range. To do this, the data processing device DV can compare the defined deviation, for example, to a predefined threshold value. If the defined deviations exceed the threshold value, they can be allocated in each case to a changed object. A change in an object is, for example, its movement. A distinction can thus be made between a motionless and a moving object.

In a step SC6, the size or the reflection area of an object which has been allocated to a detected signal range is determined. The defined deviation is evaluated here by an integration method. To do this, the data processing device DV can compare the determined size, for example, likewise to a predefined threshold value.

In a step SC7, the direction of movement of a moving object is determined, wherein a distance change of the object is calculated using the detected signal range S1 or S2 over the plurality of measuring intervals MI. Changes in the distance from the object to the sensor device SE are detected. If the distance decreases, the object is moving toward the sensor device SE, whereas if the distance increases, the object is moving away from the sensor device SE. If the distance of an object remains essentially the same, it can thus be detected, for example, that an object is moving past the sensor device SE at an essentially constant distance.

If, for example, a distinction is to be made only between motionless and moving objects, steps SC6 and SC7 do not need to be carried out. It is similarly possible to dispense with either step SC6 or step SC7 if, for example, only a direction of movement or a size of an object is to be detected.

This disclosure is not limited to the examples indicated. In particular, it is possible to combine the features or functions of the different examples with one another.

The invention claimed is:

1. A sensor device for a computer system, having a transceiver unit and a data processing device connected to the transceiver unit, wherein the data processing device is configured to
predefine emission of signals at measuring intervals for the transceiver unit;
detect, on the basis of received, reflected signals, signal ranges assignable to objects;

define a deviation in intensities of the received signal ranges over a plurality of measuring intervals for associated, detected signal ranges; and decide, on the basis of the defined deviation, whether a change has taken place in the object assigned to the respectively detected signal range.

2. The sensor device according to claim 1, wherein the data processing device is further configured to evaluate the defined deviation by an integration method to determine a size or reflection area of an object.

3. The sensor device according to claim 1, wherein the data processing device is further configured to determine a direction of movement of a moving object, and distance changes of the object are calculated on the basis of the detected signal ranges over a plurality of measuring intervals.

4. The sensor device according to claim 1, wherein the data processing device has a microcontroller.

5. The sensor device according to claim 1, which has an ultrasound sensor.

6. A desktop or tower computer system with the sensor device according to claim 1, having a display screen unit on which the sensor device is attached or into which the sensor device is integrated, wherein the computer system is configured to switch the display screen unit and/or the computer system to a predefined operating mode, on the basis of the data calculated and/or evaluated by the sensor device.

7. A method of operating the sensor device according to claim 1, comprising:
    emitting signals at a multiplicity of measuring intervals;
    receiving reflected signals within the multiplicity of measuring intervals;
    detecting signal ranges on the basis of the received, reflected signals assignable to objects;
    defining a deviation in the intensities of associated signal ranges over the multiplicity of measuring intervals; and
    deciding, on the basis of the defined deviation, whether a change has taken place in the object assigned to the respectively detected signal range.

8. The method according to claim 7, further comprising: determining the size or reflection area of an object assigned to a detected signal range, wherein the defined deviation is evaluated by an integration method.

9. The method according to claim 7, further comprising: determining directions of movement of moving objects, wherein distance changes in the objects are calculated on the basis of the detected signal ranges over the plurality of measuring intervals.

10. The method according to claim 7, in which ultrasound signals are emitted in the emission step.

11. The sensor device according to claim 1, wherein defining the deviation defines a variation in intensities of the received signal ranges over a plurality of measuring intervals for associated, detected signal ranges.

12. The method according to claim 7, wherein defining the deviation defines a variation in intensities of the received signal ranges over a plurality of measuring intervals for associated, detected signal ranges.

13. The sensor device according to claim 1, wherein detection of the single ranges comprises a comparison with a threshold value.

14. The method according to claim 7, wherein detection of the single ranges comprises a comparison with a threshold value.

15. The sensor device according to claim 1, wherein during decision whether a change has taken place the data processing unit decides whether the object assigned to the respective signal range corresponds to a moving or a static object.

16. The method according to claim 7, wherein during decision whether a change has taken place the data processing unit decides whether the object assigned to the respective signal range corresponds to a moving or a static object.

* * * * *